United States Patent [19]

Paterson et al.

[11] Patent Number: 5,519,391
[45] Date of Patent: May 21, 1996

[54] IMPROPER FLAP POSITION ON TAKE-OFF WARNING

[75] Inventors: Noel S. Paterson, Woodinville; Gary A. Ostrom, Bellevue, both of Wash.

[73] Assignee: AlliedSignal Inc., Morristown, N.J.

[21] Appl. No.: 301,802

[22] Filed: Sep. 7, 1994

[51] Int. Cl.⁶ ............................................ G08B 21/00
[52] U.S. Cl. ............................ 340/959; 340/960; 340/963; 340/970
[58] Field of Search .............................. 340/963, 967, 340/969, 970, 971, 959, 945, 960; 73/178 T; 364/427

[56] References Cited

U.S. PATENT DOCUMENTS

| | | |
|---|---|---|
| 2,738,491 | 3/1956 | Mihalakis ............................... 340/960 |
| 3,017,609 | 1/1962 | Ritchie .................................. 340/969 |
| 3,496,358 | 3/1976 | Bateman . |
| 3,947,808 | 3/1976 | Bateman . |
| 3,947,810 | 3/1976 | Bateman et al. . |
| 4,121,194 | 10/1978 | Downey et al. ........................ 340/959 |
| 4,319,218 | 3/1982 | Bateman . |
| 4,594,592 | 6/1986 | Greene .................................. 340/963 |
| 4,818,992 | 4/1989 | Paterson ............................... 340/970 |
| 4,849,756 | 7/1989 | Bateman ............................... 340/970 |
| 4,951,047 | 8/1990 | Paterson et al. ...................... 340/970 |
| 4,980,684 | 12/1990 | Paterson et al. ...................... 340/963 |
| 5,283,574 | 2/1994 | Grove .................................. 340/970 |

*Primary Examiner*—Brent A. Swarthout

[57] ABSTRACT

A warning system provides a warning to the pilot of an aircraft during a take-off mode of flight of a relatively dangerous flight condition, such as improper configuration of the flaps during a take-off mode of flight prior to the aircraft becoming airborne. In order to avoid nuisance warnings, the warning system is disabled once the aircraft becomes airborne. The warning system monitors the flap position of the aircraft as well as the airspeed and provides a warning when the flaps are improperly configured during a take-off mode of flight. Different aural warnings are provided as a function of the airspeed of the aircraft.

6 Claims, 1 Drawing Sheet

IMPROPER FLAP POSITION ON TAKE-OFF WARNING

BACKGROUND OF THE INVENTION

1. Field of the Invention

The field of the invention generally relates to a ground proximity warning system and more particularly to a system that provides a warning to the pilot of an aircraft of a relatively dangerous flight condition, such as improper configuration of the flaps during a take-off mode of flight before the aircraft becomes airborne.

2. Description of the Prior Art

Ground proximity warning systems that provide a warning of a dangerous flight condition during various modes of flight, including a take-off mode of flight, are generally known in the art. Examples of ground proximity warning systems that provide a warning during a take-off mode of flight are disclosed in U.S. Pat. Nos. 3,946,358; 3,947,808; 3,947,810; 4,818,992; 4,951,047; and 5,283,574, hereby incorporated by reference.

U.S. Pat. No. 4,319,218 discloses another warning system which provides a warning of a dangerous flight condition to the pilot of an aircraft during a take-off mode of flight. The system disclosed in the '218 patent also monitors the flap position and provides an aural warning when the flaps are down during a take-off mode of flight.

The warning systems disclosed in the above-mentioned patents are generally not enabled until the aircraft becomes airborne. However, for certain aircraft, such warning systems may not provide an adequate warning during certain flight conditions, such as a loss of an engine during take-off. For such aircraft, loss of an engine coupled with, for example, improper flap configuration, may prevent the aircraft from gaining sufficient altitude during a take-off mode of flight. Since the known warning systems are generally not enabled until the aircraft has attained, for example, at least 50 feet of radio altitude, such warning systems may not provide an adequate warning to the pilot under such conditions.

SUMMARY OF THE INVENTION

It is an object of the present invention to provide a system which provides a warning to the pilot of an aircraft when the aircraft is improperly configured for a take-off mode of flight.

It is yet another object of the present invention to provide a warning for an aircraft during a take-off mode of flight before the aircraft becomes airborne.

Briefly, the present invention relates to a warning system which provides a warning to the pilot of an aircraft of a relatively dangerous flight condition, such as, improper configuration of the flaps during a take-off mode of flight, prior to the aircraft becoming airborne. In order to avoid nuisance warnings, the warning system is disabled once the aircraft becomes airborne. The warning system monitors the flap position of the aircraft as well as the airspeed and provides a warning when the flaps are improperly configured during a take-off mode of flight. Different aural warnings are provided as a function of the airspeed of the aircraft.

BRIEF DESCRIPTION OFT HE DRAWING

These and other objects of the present invention will be readily understood with reference to the following specification and attached drawing, wherein.

DETAILED DESCRIPTION OF THE PREFERRED EMBODIMENT

The system in accordance with the present invention generates a warning to the pilot of an aircraft when the aircraft is improperly configured for a take-off mode of flight. An important aspect of the invention is that the warning is generated prior to the aircraft becoming airborne in order to provide the pilot with a sufficient warning during certain conditions, such as loss of an engine on take-off. Although the warning system is described and illustrated to provide a warning when the flaps are improperly configured for a take-off mode of flight, the principles of the invention are not so limited.

Figure 1:
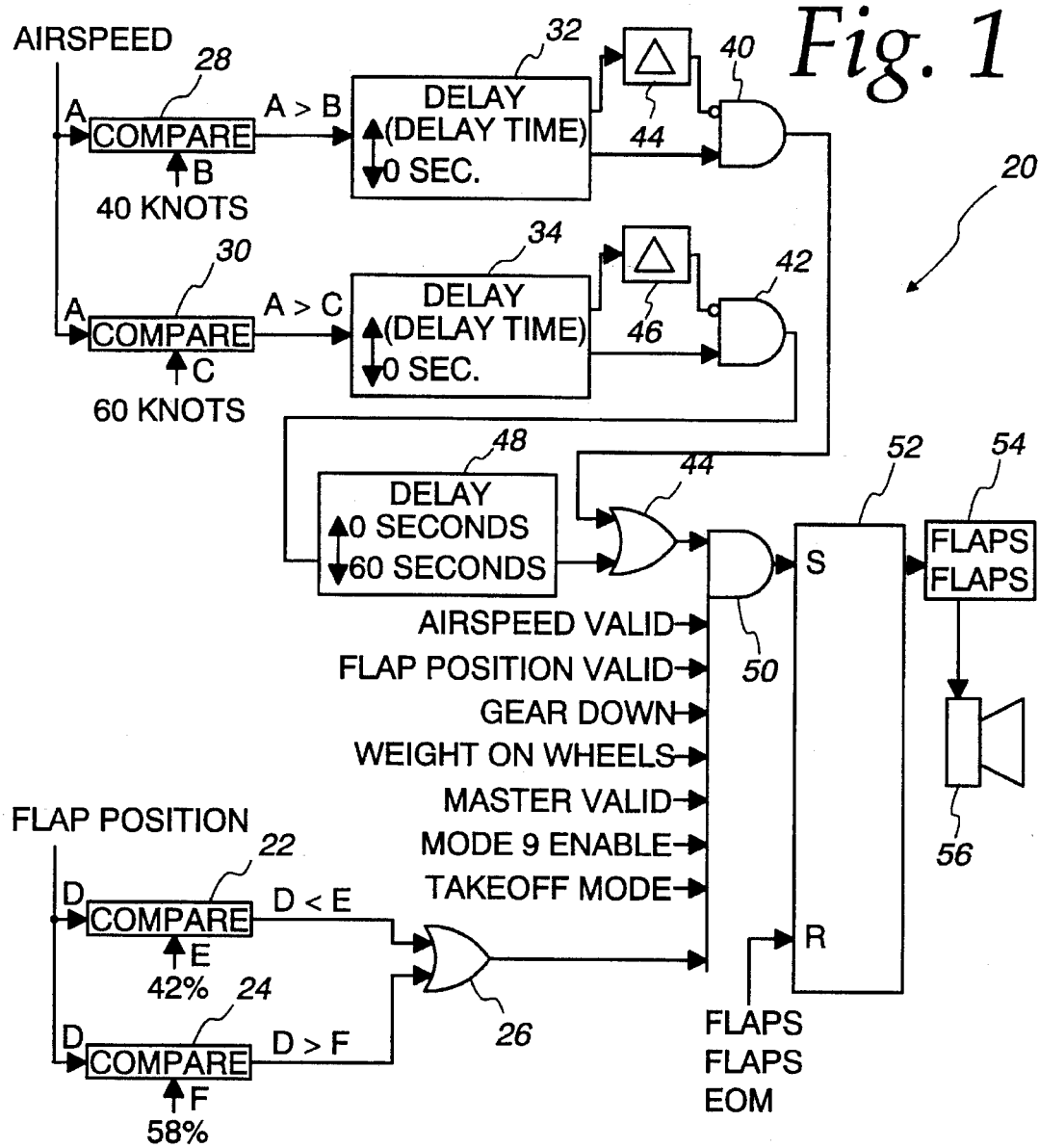
FIG. 1 is a block diagram of the warning system in accordance with the present invention.
Figure 2:
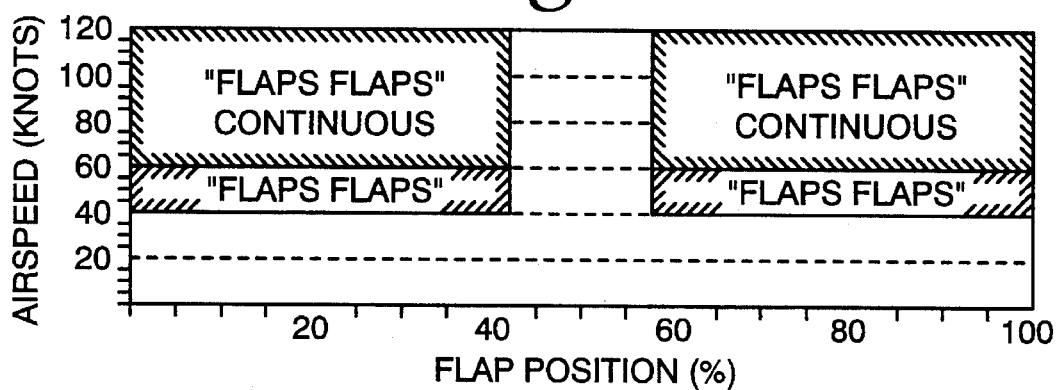
FIG. 2 is an exemplary warning envelope for a predetermined type of aircraft which illustrates the relationship between the flap position and the airspeed for a warning to be generated.

A warning system according to the invention, generally identified with the reference number 20, is illustrated in FIG. 1. An exemplary warning envelope which provides the relationship between airspeed and flap position at which a warning is generated is provided in FIG. 2. It is to be understood that the particular values selected for flap position and airspeed at which a warning is generated are exemplary. In particular, the values described herein and illustrated in FIG. 2 are based upon a type C-130 transport aircraft. However, the principles of the present invention are clearly applicable to virtually any type of aircraft.

In addition, the system according to the present invention is illustrated in FIG. 1 in functional or logical block diagram form as a series of gates, comparators and the like for purposes of illustration. However, it should be understood that the actual implementation of the logic can be other than as shown in FIG. 1 with various digital and analog implementations being possible. In addition, the signals used by the warning system as described include airspeed, signals representative of the positions of the flaps and landing gear, signals representative of whether the aircraft is in a take-off mode, a signal indicating whether there is any weight on the wheels of the aircraft and various validity signals. Depending on the type of aircraft on which the warning system is installed, the signals illustrated in FIG. 1 can be obtained from individual instruments, such as an airspeed signal source which may be an air data computer or an airspeed indicator, and from various other signal sources, such as discrete elements or on relatively newer aircraft from a digital data bus.

Referring to FIG. 1, the flap position of the aircraft during a take-off mode of flight is compared with the recommended minimum and maximum flap positions for the particular aircraft to determine if the flap settings are within the recommended range for take-off. Should the flap position be less than the recommended minimum setting or greater than the recommended maximum setting for take-off, a warning will be generated as a function of the airspeed of the aircraft before the aircraft becomes airborne. More particularly, a flap position signal, available from a discrete, is applied to a pair of comparators 22 and 24 and compared to the minimum and maximum recommended flap positions for the particular aircraft. More particularly, the comparator 22 is utilized to compare the current flap position with the minimum recommended flap position while the comparator 24 is used to compare the current flap position with the maximum recommended flap position for a take-off phase of flight.

Although the principles of the invention are applicable to various types of aircraft, a type C-130 transport aircraft is utilized for illustration. With such an aircraft, the minimum recommended flap position for take-off is about 42%, while the maximum recommended flap position for take-off is about 58%. Thus, signals representative of these minimum and maximum values are applied to the E and F inputs of the comparators 22 and 24, respectively. If the flap position is either less than the minimum recommended flap setting or greater than the maximum recommended flap setting for a take-off mode of flight, an OR gate 26, coupled to the outputs of the comparators 22 and 24, will be enabled, indicating that the flaps are improperly configured for a take-off.

A signal representative of the airspeed of the aircraft, available either from an airspeed indicator or on certain new aircraft from an air data bus, is applied to the A inputs of a pair of comparators 28 and 30. Reference ground speeds are applied to the B and C inputs of the comparators 28 and 30 to enable the warning system 20 to provide different aural flap warnings as a function of the ground speed of the aircraft. For a type C-130 transport aircraft the reference ground speed inputs applied to the B and C inputs of the comparators 28 and 30, respectively, are selected as 40 and 60 knots. As will be discussed in more detail below, once the OR gate 26 is enabled, representing the flaps are improperly configured for take-off, a first aural warning will be generated when the ground speed of the aircraft is greater than 40 knots. At relatively higher ground speeds of the aircraft, for example, 60 knots, the warning system 20 generates a second aural warning.

In order to avoid spurious warnings as a result of wind gusts, the outputs of the comparators 28 and 30 are applied to gust filters 32 and 34, respectively. The gust filters 32 and 34 are implemented as timing devices which delay the outputs of the comparators 28 and 30 when they are high for a predetermined time delay, indicating improper configuration of the flaps. For a type C-130 transport aircraft, the delay times are selected to be about 2.0 seconds. Thus, anytime the output of the comparators 28 and 30 is high, the timing will be initiated, keeping the outputs of the gust filters 32 and 34 low until the delay time has elapsed.

The outputs of the gust filters 32 and 34 are applied to non-inverting inputs of a pair of AND gates 40 and 42. In order to reset the circuit after each cycle, the outputs of the gust filters 32 and 34 are also applied to sample and hold devices 44 and 46, whose outputs, in turn, are applied to inverting inputs of the AND gates 40 and 42. Thus, anytime the outputs of either of the comparators 32 and 34 is high, representing that the ground speed of the aircraft is greater than 40 or 60 knots, respectively, the AND gates 40 or 42 will be enabled for one cycle and subsequently disabled by the sample and hold devices 44 and 46.

As mentioned above, the warning system 20 is adapted to provide two different aural warnings. The output of the AND gate 40, which represents that the ground speed of the aircraft is greater than 40 knots, for example, is applied to an OR gate 44. As will be discussed in more detail below, the AND gate 40 is used to generate a "FLAPS-FLAPS" warning (with a predetermined pause between each word, for example, of 0.75 seconds) when the ground speed of the aircraft is greater than 40 knots and the configuration of the flaps is improper for a take-off mode of flight. At relatively higher ground speeds, for example, 60 knots, the AND gate 42 is used to generate an aural flaps warning with the FLAPS warning being repeated continuously, with predetermined pauses, for example, 0.75 second pauses.

Both of the flaps warnings are under the control of an AND gate 50. Signals representative of the airspeed being greater than 40 or 60 knots, available at the output of the OR gate 44 are applied to the AND gate 50 along with signals representative of an improper flap configuration for take-off, available at the output of the OR gate 26. In order to avoid spurious operation of the warning system and to assure that the warning is provided on take-off before the aircraft becomes airborne, signals representative that the gear is down and that there is weight on the wheels are applied to the AND gate 50. The gear down signal, as well as the weight on wheels signal is available from discretes aboard the aircraft. In addition, a signal representative of the take-off mode is also applied to the AND gate 50, along with various validity signals to be discussed below. Various signals may be used as a take-off mode signal. For example, as disclosed in U.S. Pat. No. 4,951,047, hereby incorporated by reference, engine power may be used to represent that the aircraft is in a take-off mode of operation. In addition, various validity signals, such as airspeed signal valid, flap position signal valid and a master signal valid are also applied to the AND gate 50 to inhibit operation of the warning system during a condition when the instruments providing input signals to the system are either faulty or unstable. Additionally, a Mode 9 enable signal is also applied to the AND gate 50 to enable the system to be manually disabled in certain circumstances.

The output of the AND gate 50 is used to drive a latch 52, implemented as a set-reset flip flop. The output of the latch 52 drives a voice generator 54, which, in turn is connected to a headphone or a loudspeaker 56. The voice generator 54 is preferable a digital voice generator, which generates a FLAPS-FLAPS voice warning with each word being separated by a predetermined pause (i.e. 0.75 seconds) in response to an initiation signal, such as the output of the latch 52. An end of message (EOM) signal from the voice generator 54 is used to reset the latch 52 after each FLAPS-FLAPS warning.

As mentioned above, two different aural warnings are provided as a function of the airspeed of the aircraft. In particular, a FLAPS-FLAPS warning is generated when the ground speed of the aircraft is greater than, for example, 40 knots, but less than, for example, 60 knots. During this condition, the AND gate 40 is enabled for a single cycle as discussed above to set the latch 52. The latch 52, in turn, drives the FLAPS-FLAPS voice generator and the loudspeaker 56. The EOM signal resets the latch after the FLAPS-FLAPS warning is generated.

When the ground speed of the aircraft is greater than, for example, 60 knots, a continuous voice warning is generated. In particular, a FLAPS warning is generated continuously with a predetermined pause (i.e. 0.75 seconds) between each warning. In this condition, a delay device 48, connected between the AND gate 42 and the OR gate 44, keeps the OR gate 44 enabled for a sufficient time (i.e. 60 seconds), until the aircraft becomes airborne. The OR gate 44 enables the AND gate 50 which, in turn, sets the latch 52. As mentioned above, the latch 52 will cause a FLAPS-FLAPS warning to be generated. After the FLAPS-FLAPS warning is generated, the EOM signal will reset the latch 52. However, since the OR gate 44 and thus the AND gate 50 are enabled until the aircraft becomes airborne, the cycle of generating the FLAPS-FLAPS warning and resetting the latch 52 will be continuously repeated until the time delay device 48 times out, thus providing a continuous warning.

The warning envelope for the warning system 20 is illustrated in FIG. 2. The horizontal axis represents flap position as a percentage of the maximum flap position while the vertical axis represents airspeed. As discussed above, the warning envelope is an exemplary envelope for a type C-130 transport aircraft. As shown, for flap positions less than the minimum recommended flap position recommended for such an aircraft (42% for a type C-130 transport aircraft), the flaps warning is generated as long as the airspeed is greater than 40 knots. Similarly, when the flap position is greater than the maximum recommended flap position recommended for take-off (58% for a type C-130 transport aircraft), a FLAPS warning is generated anytime the airspeed is greater than 40 knots. As mentioned above, two different aural warnings are generated as a function of the airspeed of the aircraft assuming the flap position is either less than the minimum recommended or greater than maximum recommended flap positions for take-off. In particular as shown, a first aural warning is generated when the airspeed of the aircraft is greater than 40 knots but less than 60 knots. During this condition, a FLAPS-FLAPS warning is generated. When the speed of the aircraft is greater than 60 knots, a continuous FLAPS warning is generated.

Obviously, many modifications and variations of the present invention are possible in light of the above teachings. Thus, it is to be understood that within the scope of the appended claims, the invention may be practiced otherwise than as specifically described above.

What is claimed and desired to be secured by Letters Patent of the United States is:

1. A system for providing a warning to the pilot of an aircraft of a dangerous flight condition, the warning comprising:

means for monitoring the flap position of the aircraft;

means for determining whether the aircraft is in a take-off phase of flight;

means for comparing the flap position of the aircraft with one or more predetermined reference values for a take-off phase of flight;

means for monitoring the airspeed of the aircraft; and means for providing plural, different improper flap configuration warnings to the pilot of an aircraft as a predetermined function of the airspeed of the aircraft and the comparison by said comparing means, such that at least a first improper flap warning is provided for a first range of airspeeds and at least a second different improper flap warning is provided for a second different range of airspeeds.

2. A system as recited in claim 1, wherein said predetermined function is when the flap position is less than a predetermined value.

3. A system as recited in claim 1, wherein said predetermined function is when the flap position is greater than a predetermined value.

4. A system as recited in claim 1, wherein providing means provides a first warning signal when the airspeed of the aircraft is greater than a first predetermined value.

5. A system as recited in claim 4, wherein said providing means provides a second warning signal when the airspeed of the aircraft is greater than a second predetermined value.

6. A system for providing a warning to the pilot of aircraft, comprising:

means for monitoring the flap position of an aircraft;

means for determining when the aircraft is in a take-off phase of flight;

means for monitoring the airspeed of the aircraft;

means for determining when the aircraft is airborne; and means responsive to said flap position monitoring means, said airspeed monitoring means and said phase of flight determining means for providing a plurality of different improper flap configuration warnings when the flap position of the aircraft is improper for a predetermined phase of flight and predetermined ranges of airspeed such that at least a first improper flap warning is provided for a first range of airspeeds and at least a second different improper flap warning is provided for a second different range of airspeeds unless the aircraft is airborne.

* * * * *